United States Patent [19]

Martin

[11] Patent Number: 4,914,695
[45] Date of Patent: Apr. 3, 1990

[54] METHOD AND APPARATUS FOR FREQUENCY CONTROL OF MULTIPLE OSCILLATORS USING A SINGLE FREQUENCY-LOCKED-LOOP

[75] Inventor: Thomas F. Martin, Richardson, Tex.

[73] Assignee: General Instrument Corporation, New York, N.Y.

[21] Appl. No.: 266,567

[22] Filed: Nov. 3, 1988

[51] Int. Cl.$^4$ .................. H04N 7/167; H03L 7/00
[52] U.S. Cl. .......................... 380/7; 331/2; 331/14; 380/8; 455/1
[58] Field of Search .......... 455/1; 331/2, 14; 380/7, 8

[56] References Cited

U.S. PATENT DOCUMENTS

| | | | |
|---|---|---|---|
| 3,927,384 | 12/1975 | Jezo | 331/2 |
| 4,039,954 | 8/1977 | den Toonder | 455/1 |
| 4,135,157 | 1/1979 | den Toonder. | |
| 4,367,557 | 1/1983 | Stern et al. | 455/4 |
| 4,450,481 | 5/1984 | Dickinson. | |

Primary Examiner—Stephen C. Buczinski
Attorney, Agent, or Firm—Barry R. Lipsitz

[57] ABSTRACT

Frequency control of multiple oscillators using a single frequency locked loop is accomplished by a single frequency-control device that is time-shared with a plurality of voltage-controlled oscillators and selectively establishes a "desired" frequency for each oscillator. The output of each oscillator is, in turn, selectively routed to a frequency counter which measures the "actual" frequency of the oscillator. A comparison between the desired frequency and the actual measured frequency for each oscillator is made, and an error voltage developed. This error voltage is routed to the appropriate capacitor, which stores the voltage required to keep the selected oscillator on frequency until the next time it is measured.

18 Claims, 2 Drawing Sheets

METHOD AND APPARATUS FOR FREQUENCY CONTROL OF MULTIPLE OSCILLATORS USING A SINGLE FREQUENCY-LOCKED-LOOP

TECHNICAL FIELD OF THE INVENTION

The invention relates to cable television signal control and, more particularly, to a technique for providing off-premise control of cable channels by jamming unauthorized channels.

BACKGROUND OF THE INVENTION

One approach to off-premise control of cable channels is to jam unauthorized channels with an inband carrier. This carrier can be moved rapidly from channel to channel, allowing one oscillator to jam several channels (agile jammer). The problem with this approach is that, as more channels are jammed, the time spent on each channel decreases, which decreases the masking ("scrambling") of the signals.

An alternative approach uses an oscillator for each of a number, N, of jammed channels. This oscillator is voltage tunable, and thus may be moved to any channel in a reasonable range. Once it is on its assigned channel, it must be kept there using frequency-lock or phase-lock techniques.

If a large number of oscillators (for example, eight to twelve) is required, individual frequency-lock control of each would be very costly.

U.S. Pat. No. 4,135,157, entitled "Pole Mounted Converter", discloses cable television converter means including a plurality of individual converter RF sections, each including an oscillator and a mixer. A plurality of subscriber channel selection means are connected, along with each of the oscillators to a digital tuning system. The digital tuning system sequentially and repetitively is connected to each subscriber selection means and its associated oscillator to provide tuning control during the period of such connection. Tuning control is provided by comparing the frequency of the oscillator with the selected channel oscillator frequency as provided by the subscriber selection means.

The following U.S. patents are noted of interest: U.S. Pat. No. 4,450,481, entitled "Tamper-Resistant Expandable Communications Systems", and U.S. Pat. No. 4,367,557, entitled "Wired Broadcasting Systems".

DISCLOSURE OF THE INVENTION

It is an object of this invention to provide a technique for off-premise control of cable channels to jam unauthorized channels, which technique provides better masking quality.

It is a further object to provide a "dedicated" oscillator for each channel without the cost associated with a frequency locked loop for each oscillator.

According to the invention, a single frequency-control device is time-shared with a plurality of voltage-controlled oscillators and selectively establishes a "desired" frequency for each oscillator. The output of each oscillator is, in turn, selectively routed to a frequency counter which measures the "actual" frequency of the oscillator. A comparison between the desired frequency and the actual measured frequency for each oscillator is made, and an error voltage (or current) developed. This error voltage (or current) is routed to the appropriate capacitor, which stores the voltage required to keep the selected oscillator on frequency until the next time it is measured.

Other objects, features and advantages of the invention will become apparent in light of the following description thereof.

DETAILED DESCRIPTION OF THE INVENTION

Figure 1:
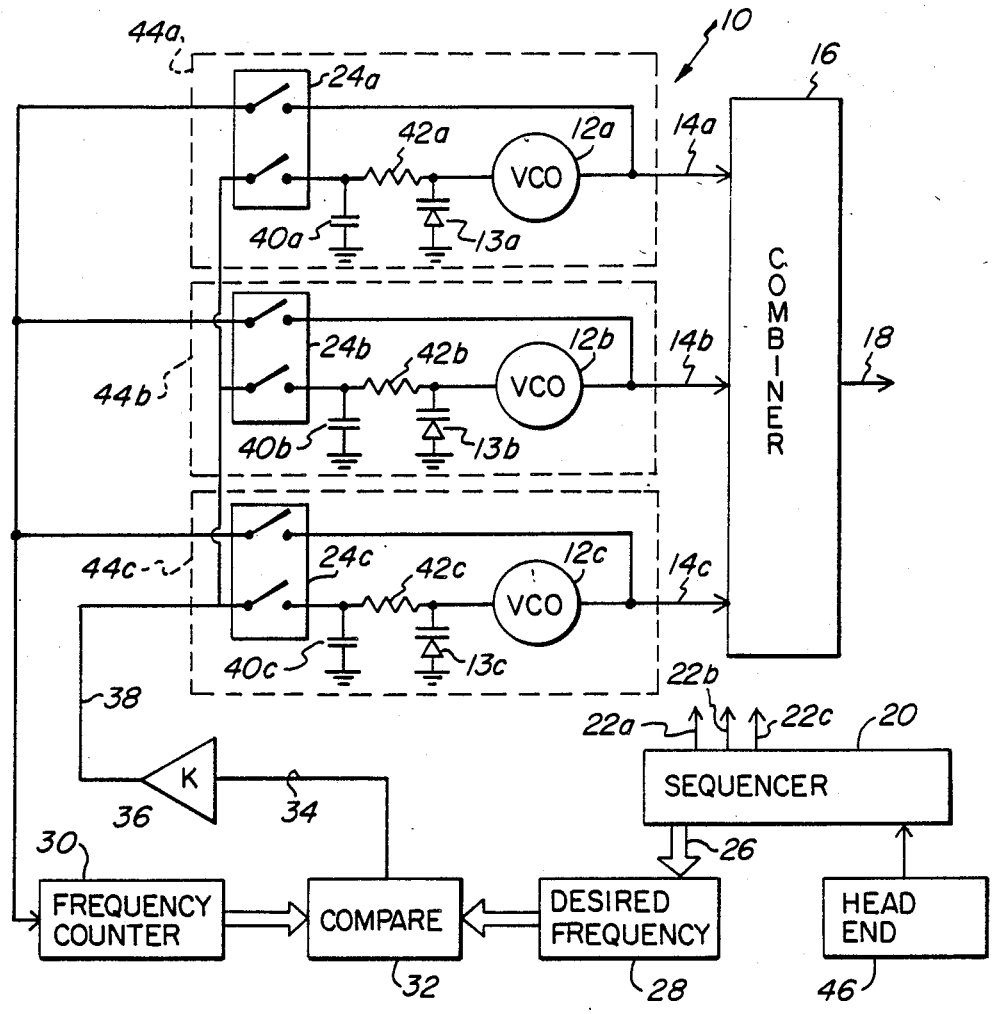
FIG. 1 is a block diagram of the jammer of this invention, illustrating an example of "Agile Frequency Locked Loop (FLL)" with three oscillators.

FIG. 1 shows frequency control of a jammer 10, according to the present invention. A plurality of tunable, such as voltage controlled, oscillators (VCOs) 12a, 12b and 12c each output a radio frequency (RF) signal corresponding to a particular television (TV) channel on a corresponding line 14a, 14b and 14c to a combiner 16, the output (jamming comb) of which, on a line 18 is the combined RF output of the VCOs. The jamming comb is mixed with signals on the cable drop to a subscriber according to known techniques. The frequency of each VCO 12a, 12b, 12c is determined by voltage-responsive capacitance means, or varactor 13a, 13b, 13c, respectively.

In general, the VCOs 12a, 12b, 12c operate continuously. However, their frequency is adjusted periodically in response to a sequencer 20 which sequentially, one-by-one, accesses the VCOs in the following manner. The sequencer 20 outputs a sequence of control signals (logic one or logic zero) on lines 22a, 22b, 22c to switches 24a, 24b, 24c, each of which is associated with a VCO 12a, 12b, 12c, respectively. The switches 24a, 24b, 24c are preferably solid state switching devices responsive to logic signals, and are illustrated with their two sets of "contacts" open.

In an exemplary Frequency Locked Loop (FLL) mode of operation, the sequencer 20 outputs a signal on the line 22a to close the switch 24a. Simultaneously, the sequencer 20 provides a signal on a line 26, such as a digital channel number, to a frequency generator 28 in order that the frequency generator provides an output indicative of the "desired" frequency of VCO 12a. A frequency counter 30 is responsive, via the closure of the switch 24a, to the RF output signal of the VCO 12a on the line 14a, and provides an output indicative of the "actual" frequency of the VCO 12a during the time period at which the switch 24a is closed. A comparator 32 is responsive to the "desired" frequency output of the frequency generator and the "actual" frequency output of the frequency counter, both of which may be scaled and both of which may be either analog or digital signals, and provides an analog or digital output on a line 34 which is indicative of the "error" in the "actual" frequency as compared with the "desired" frequency. (In a digital embodiment, the comparator 32 may simply be a parallel comparator with a high/low output.) The "error" signal may be obtained with a summing junction by simple subtraction. The "error" signal on the line 34 is scaled by an amplifier 36 having a gain, K, and is passed on a line 38 to the VCO 12a via the switch 24a to a capacitor 40a to control the frequency of the VCO 12a. The voltage level applied to the capacitor 40a by the amplifier 36 is established such that the capacitance of the varactor 13a is appropriate for the "desired"

frequency of VCO 12a. As will be described with respect to FIG. 2, hereinafter, applying a known current to the capacitor for a known time will yield a more predictable voltage change in the capacitor irrespective of its initial charge state. The capacitor 40a is connected to the varactor 13a, as shown. It is evident that the voltage on the capacitor 40a may decay once the amplified error signal on the line 38 is no longer applied thereto (when the switch 24a opens), as discussed hereinafter, and that the frequency of the VCO 12a may consequently drift during the decay period. However, in the context of providing jamming signals in a cable network, some frequency drift is entirely acceptable, perhaps even desirable, so long as the drift is within the channel bandwidth.

This is a notable difference between the present invention and the aforementioned U.S. Pat. No. 4,135,157. In the aforementioned '157 patent, the synthesized frequency is used for selection of a desired channel. In the present invention, the synthesized frequency is used for jamming unauthorized channels. In the former, any resulting frequency drift is undesirable, whereas in the latter, some frequency drift is desirable since jamming is enhanced.

Technically, the VCOs 12a, 12b, 12c include the respective varactors 13a, 13b, 13c and resistors 42a, 42b, 42c.

A channel 44a (not to be confused with a broadcast channel, discussed elsewhere herein) is defined as the VCO 12a, the varactor 13a, the switch 24a, the capacitor 40a and the resistor 42a.

A channel 44b is defined as the VCO 12b, the varactor 13b, the switch 24b, the capacitor 40b, and the resistor 42b.

A channel 42c is defined as the VCO 12c, the varactor 13c, the switch 24c, the capacitor 40c, and the resistor 42c.

In like manner to the frequency locked loop (FLL) control exercised over the channel 44a by the sequencer 20 and associated elements 28, 30, 32, 36, frequency locked loop control is exercised over the channels 44b and 44c, sequentially, one-by-one, in order to maintain their RF output at a designated, predetermined frequency within a broadcast channel that is to be jammed by the jamming system 10. The operation of the sequencer 20 is cyclic in that once during each cycle of the sequencer, the output frequency of each of the oscillators is adjusted.

The sequencer 20 is preferably a microprocessor responsive to signals from the "head end", or cable TV transmission facility 46, in order to control the access to the jammable channels on a per-subscriber basis, according to techniques that are known in the art.

One skilled in the art to which this invention most nearly pertains would readily be enabled to implement the invention from the above description thereof.

Figure 2:
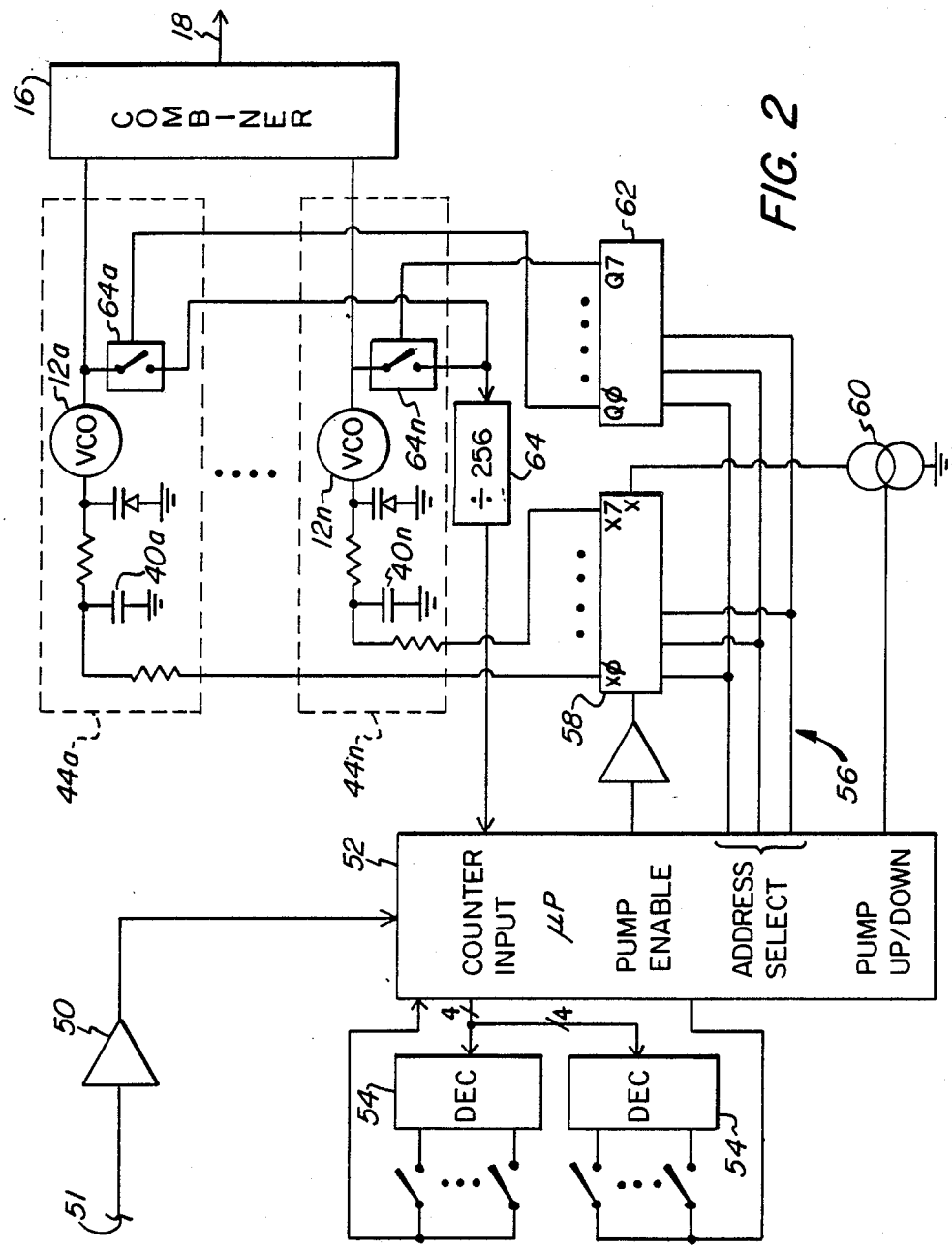
FIG. 2 is a block diagram of the jammer of this invention.

FIG. 2 shows a digital embodiment of the jamming system of this invention. VCOs 12a through 12n are indicated to illustrate that up to a number, n, such as eight, VCOs can be controlled by the jamming system to jam up to a number, N, such as eight, channels.

A FSK (frequency shift keyed) Data Receiver 50 receives data from the "head end" 51 indicative of which channels should be jammed for which subscriber. Each device has a unique 20-bit, for example, address to allow unique authorization messages to be sent to each subscriber.

A 20-position switch and two binary-to-decimal decoders 54 are connected to the microprocessor to facilitate setting this unique address.

The microprocessor 52 is programmed to cycle through a number, n, of oscillators 12a through 12n, sequentially as described with respect to FIG. 1. This is accomplished via address lines 56 from the microprocessor 52 that control the following switching mechanisms. A CMOS switch 58 has eight outputs, X0 through X7, each for connecting current from a bilateral current source 60 to a selected one of the capacitors 40a through 40n, as selected by the microprocessor output on address lines 56. Similarly, a binary to octal device 62 is responsive to the address on the lines 56 to select one of the switches 64a through 64n connected to the outputs of the oscillators 12a through 12n. These switches 64a through 64n are preferably PIN-diodes.

When the channel 44a is selected, the output frequency of the VCO 12a is provided to a prescaler 64 which divides the output frequency, for example, by 256. The scaled output frequency is provided to the counter input of the microprocessor 52. Furthermore, a divide-by-four prescaler (not shown) can be provided internally in microprocessor 52.

By way of example, assume that there are eight oscillators 12a through 12h designed to operate in the range of 120–174 MHz. This would permit eight 6 MHz television (TV) channels to be jammed. While it may be desirable to jam all eight channels, a greater degree of flexibility is desired in the utilization of this invention. For instance, it may be desirable to jam a single broadcast channel with two or more oscillators, perhaps one for jamming audio and one for jamming video. If universally applied to all jammed channels, this scheme would require n oscillators for N broadcast channels, where n is an integral multiple of N. Furthermore, it is desirable that a certain degree of fineness in the tuning of the VCOs be available due to the fact that the masking effectiveness varies with respect to the relationship between the VCO output frequency and the video (or audio) carrier signal.

To this end the inventor selected a step size of 0.25 MHz for the VCO's under microprocessor control. To achieve this step size, given the prescaling of VCO output frequency by 256 (external) and 4 (internal to the microprocessor) as discussed hereinbefore, it was determined that a frequency measuring window (time during which the prescaled output frequency pulses are counted by the microprocessor) of 4.096 milliseconds was required. This time window allows from 480 counts (at 120 MHz) to 696 counts (at 174 MHz) to be input to the counter in the microprocessor.

Other time windows (hence, step sizes) could be effectively used. For example, a window of 4.3691 milliseconds would lead to counts of 512 to 742 and a step size of 0.234375 MHz. This has the advantage that an 8-bit counter always overflows twice for any frequency in the range, thus overflows do not have to be accounted for in the microprocessor software. The disadvantage to this step size is an error in the actual frequencies compared to the desired frequencies, as shown by example in the Table below.

TABLE

| Desired | Actual | Freq. Error | Count |
|---------|--------|-------------|-------|
| 121.25 | 121.172 | −78 kHz | 517 |
| 145.25 | 145.312 | +62 kHz | 620 |
| 169.25 | 169.219 | −31 kHz | 722 |

TABLE-continued

| Desired | Actual | Freq. Error | Count |
|---|---|---|---|
| 120.00 | 120.000 | −0 kHz | 512 |
| 144.00 | 143.906 | −94 kHz | 614 |
| 168.00 | 168.047 | +47 kHz | 717 |

It was noted by the inventor that an error of ONE in the scaled output frequency count would lead to an error in oscillator frequency equal to the step size. This problem would be alleviated by providing a wider measuring window.

However, the inventor realized that by randomly adding a number to the frequency count, the frequency of an oscillator could be intentionally dithered (varied randomly) from cycle to cycle, for improved security.

In the embodiment of FIG. 2, a charge pump 60 is used to apply current through the switch 58 to the capacitors 40a–40n. As mentioned hereinbefore, a greater degree of certainty with respect to the voltage change, either up or down, in the capacitor can be achieved in this manner. When the system is designed to apply small voltage increases (or decreases) to the capacitors on a cycle-by-cycle basis, it may take several cycles of accessing a particular oscillator to achieve a large frequency shift in the oscillator. However, with reference to FIG. 2, the time that the charge pump is on can be controlled by the pump enable output of the microprocessor 52 in proportion to the difference between the "actual" frequency and the "desired" frequency. With regard to the embodiment of FIG. 1, a digital-to-analog converter could be placed at the output of a digital comparator 32 to effect a similar result.

What is claimed is:

1. Apparatus for providing jamming of a number, N, of cable TV channels, comprising:
   a number, n, of variable frequency oscillators;
   means for unswitchably coupling the outputs of each of said oscillators onto a line for input to a television set or the like;
   means for tuning said oscillators to frequencies for jamming selected television channels; and
   means for terminating the jamming of a particular television channel by retuning each oscillator jamming the particular channel to another frequency while the oscillators are coupled to said line;
   wherein a jamming comb containing jamming signals from all of said oscillators is continuously present on said line during the operation of said apparatus.

2. Apparatus according to claim 1, wherein each variable-frequency oscillator is a voltage controlled oscillator.

3. Apparatus according to claim 2 further comprising:
   voltage variable capacitance means associated with each oscillator for establishing the frequency thereof in response to a voltage applied thereto.

4. Apparatus according to claim 1 wherein said line is a cable drop for a single subscriber premises, and said apparatus is used only to jam cable TV channels delivered to said single subscriber premises.

5. Apparatus according to claim 1 wherein said tuning means comprises:
   frequency generator means for providing a "desired" frequency signal for each oscillator in response to channel signals;
   measuring means for measuring the output frequency of each oscillator and for providing an "actual" frequency signal indication thereof;
   comparator means, responsive to the "desired" frequency signal and to the "actual" frequency signal for each oscillator, for providing an error signal to adjust the output frequency of each oscillator; and
   means for sequentially providing a number of channel signals to the frequency generator means, for sequentially applying the outputs of the oscillators to the measuring means, and for selectively applying the error signal to each oscillator.

6. Apparatus according to claim 5, further comprising:
   a capacitor associated with each oscillator and responsive to the error signal.

7. Apparatus according to claim 5, further comprising:
   a capacitor associated with each oscillator; and
   a bilateral charge pump;
   wherein the error signal controls the application of current from the charge pump to the capacitor associated with each oscillator to control the frequency of the oscillators.

8. Apparatus according to claim 5 wherein the means for sequentially applying the outputs of the oscillators to the measuring means and for sequentially applying the error signal to the oscillators is a number, n, of switches, each associated with an oscillator.

9. Apparatus according to claim 8 wherein the switches are solid state switches.

10. Apparatus according to claim 5 wherein the error signal is gain amplified prior to application to each oscillator.

11. Apparatus according to claim 5 wherein the "desired" frequency signal and the "actual" frequency signal are scaled prior to being provided to the comparator means.

12. A method of providing a multichannel output for selectively jamming television channel signals carried on a subscriber drop, comprising the steps of:
   providing a plurality of variable frequency oscillators having outputs;
   combining the outputs of the oscillators into a multichannel output for unswitched application of each oscillator output to a subscriber drop;
   tuning said oscillators to frequencies for jamming selected television channel signals; and
   terminating the jamming of a particular television channel by retuning each oscillator jamming the particular channel to another frequency while the oscillators are coupled to said subscriber drop.

13. A method according to claim 12 wherein two or more oscillators are used to jam different segments of a particular broadcast channel.

14. A method according to claim 12 wherein said multi-channel output comprises television channel jamming signals for communication solely to a single premises.

15. A method according to claim 12 wherein said tuning step comprises the steps of:
   measuring the output frequency of a selected one of the plurality of oscillators;
   establishing a plurality of "desired" output frequencies for the plurality of oscillators; and
   sequentially selecting the plurality of oscillators, one-by-one, and when a particular oscillator is selected adjusting the output frequency of the oscillator based on the "desired" output frequency for that oscillator and the measured output frequency of that oscillator.

16. A method according to claim 15, wherein the adjustment of the output frequency of each oscillator, when selected, is made in small, fixed increments towards the "desired" output frequency each time the oscillator is selected.

17. A method according to claim 15 comprising the further step of changing said "desired" output frequencies to effect the jamming of different cable television broadcast channels when a cable television subscriber's level of service is changed.

18. Apparatus according to claim 15 further comprising means for dithering said error signal to provide enhanced jamming.

* * * * *